United States Patent
Badger, II

(10) Patent No.: US 11,113,953 B2
(45) Date of Patent: Sep. 7, 2021

(54) VEHICLE-PAIRED DEVICE RANGE EXTENSION METHOD AND SYSTEM

(71) Applicant: Ford Global Technologies, LLC, Dearborn, MI (US)

(72) Inventor: Charles Everett Badger, II, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 772 days.

(21) Appl. No.: 15/265,007

(22) Filed: Sep. 14, 2016

(65) Prior Publication Data

US 2018/0075735 A1 Mar. 15, 2018

(51) Int. Cl.
| | |
|---|---|
| *G08C 17/02* | (2006.01) |
| *H02J 7/00* | (2006.01) |
| *B60L 53/68* | (2019.01) |
| *H04B 7/155* | (2006.01) |
| *H04W 76/14* | (2018.01) |
| *H04B 7/145* | (2006.01) |
| *H04W 84/12* | (2009.01) |

(52) U.S. Cl.
CPC .............. *G08C 17/02* (2013.01); *B60L 53/68* (2019.02); *H02J 7/007* (2013.01); *H02J 7/0088* (2013.01); *H04B 7/145* (2013.01); *H04B 7/15507* (2013.01); *H04W 76/14* (2018.02); *B60L 2250/12* (2013.01); *H02J 7/00034* (2020.01); *H04W 84/12* (2013.01)

(58) Field of Classification Search
None
See application file for complete search history.

(56) References Cited

U.S. PATENT DOCUMENTS

| | | | |
|---|---|---|---|
| 8,624,719 B2 | 1/2014 | Klose et al. | |
| 2013/0110632 A1* | 5/2013 | Theurer | G06F 1/266 |
| | | | 705/14.58 |
| 2014/0103866 A1* | 4/2014 | Kothavale | H02J 7/0027 |
| | | | 320/108 |
| 2014/0176301 A1 | 6/2014 | Fernandez Banares et al. | |

(Continued)

FOREIGN PATENT DOCUMENTS

| | | |
|---|---|---|
| CN | 104648323 | 5/2015 |
| WO | 2015200342 | 12/2015 |

OTHER PUBLICATIONS

Tskayama, Mitsumasa, Toshihide Ueda, and Kunio Nishiooka, Socio-Economic Operational Tests of Electric Vehicle Systems: Complementing Merits and Demerits with ITS Technologies (II), The Association of Electronic Technology for Automobile Traffic and Driving (JSK), pp. 1-8, Tokyo, Japan.

*Primary Examiner* — Daniell L Negron
(74) *Attorney, Agent, or Firm* — David Kelley, Esq.; Carlson, Gaskey & Olds, P.C.

(57) ABSTRACT

An exemplary method of controlling a vehicle from a remote location includes receiving a first signal from a vehicle-paired device and initiating a vehicle function in response to the first signal. The first signal is sent by the vehicle-paired device in response to a second signal sent from a secondary triggering device. An exemplary range extending system includes a vehicle-paired device configured to transmit a first signal to a vehicle, and a secondary triggering device that transmits a second signal to the vehicle-paired device to initiate a transmission of the first signal from the vehicle-paired device.

19 Claims, 2 Drawing Sheets

(56) References Cited

U.S. PATENT DOCUMENTS

2014/0306833 A1\* 10/2014 Ricci ...................... B60Q 1/00
 340/901
2015/0363988 A1 12/2015 Van Wiemeersch et al.
2016/0075249 A1\* 3/2016 Grabar ................ B60L 11/1833
 320/108

\* cited by examiner

VEHICLE-PAIRED DEVICE RANGE EXTENSION METHOD AND SYSTEM

TECHNICAL FIELD

This disclosure relates generally to controlling a function of a vehicle with signals routed through a first device that is paired with a vehicle. The signals are commands that originate from a second device.

BACKGROUND

A vehicle-paired device, such as a keyfob or a non-keyfob device, can send a command signal to a vehicle to initiate a vehicle function. A user interacts with the vehicle-paired device to initiate the command signal that is transmitted to the vehicle.

The vehicle may not receive the command signal if the vehicle-paired device is too far away. The vehicle may not receive the command signal if structures, such as the walls of a home, interfere with the transmission.

The user can transmit a command signal to the vehicle without the vehicle-paired device. For example, the user can interact with a computer to transmit a command signal. A cloud-server receives the command signal from the computer and relays the command signal back to the vehicle. This approach can expose user data to a third party managing the cloud server, which may be undesirable to some users.

SUMMARY

A method of controlling a vehicle from a remote location according to an exemplary aspect of the present disclosure includes, among other things, receiving a first signal from a vehicle-paired device and initiating a vehicle function in response to the first signal. The first signal is sent by the vehicle-paired device in response to a second signal sent from a secondary triggering device.

In another example of the foregoing method, the first signal is received at a vehicle.

In another example of any of the foregoing methods, the vehicle-paired device is in a first location remote from the vehicle and the secondary triggering device is in a second location remote from the vehicle.

In another example of any of the foregoing methods, the second location is further from the vehicle than the first location.

In another example of any of the foregoing methods, the vehicle has a communication range. The vehicle can receive the first signal and then initiate the vehicle function when the vehicle-paired device is within the communication range. The vehicle cannot receive the first signal and then initiate the vehicle function when the vehicle-paired device is outside the communication range.

In another example of any of the foregoing methods, the secondary triggering device is outside the communication range.

In another example of any of the foregoing methods, the second signal is communicated from the secondary triggering device to the vehicle-paired device via a local area network.

Another example of any of the foregoing methods includes the initiating of the vehicle function as stopping a charging procedure.

In another example of any of the foregoing methods, the secondary triggering device is part of a home control system.

A range extending system according to another exemplary aspect of the present disclosure includes, among other things, a vehicle-paired device configured to transmit a first signal to a vehicle, and a secondary triggering device that transmits a second signal to the vehicle-paired device to initiate a transmission of the first signal from the vehicle-paired device.

In another example of the foregoing system, the secondary triggering device communicates the second signal to the vehicle-paired device via a Wi-Fi network.

In another example of any of the foregoing systems, the vehicle-paired device is a non-key fob device.

In another example of any of the foregoing systems, the vehicle-paired device is mounted in a fixed position outside the vehicle.

In another example of any of the foregoing systems, the vehicle-paired device is in a first position within a communication range of the vehicle, and the secondary triggering device is outside the communication range.

In another example of any of the foregoing systems, the secondary triggering device is remote from the vehicle-paired device.

Another example of any of the foregoing systems includes the vehicle, and the vehicle is configured to initiate a vehicle function in response to the first signal.

In another example of any of the foregoing systems, the vehicle function comprises stopping a charge of a traction battery of the vehicle.

In another example of any of the foregoing systems, the secondary triggering device is part of a home control system.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to commanding a vehicle from a location remote from the vehicle. A user initiates the command from a secondary triggering device at the location. The command is transmitted from the secondary triggering device to a primary device, which relays the command to the vehicle.

Figure 1:
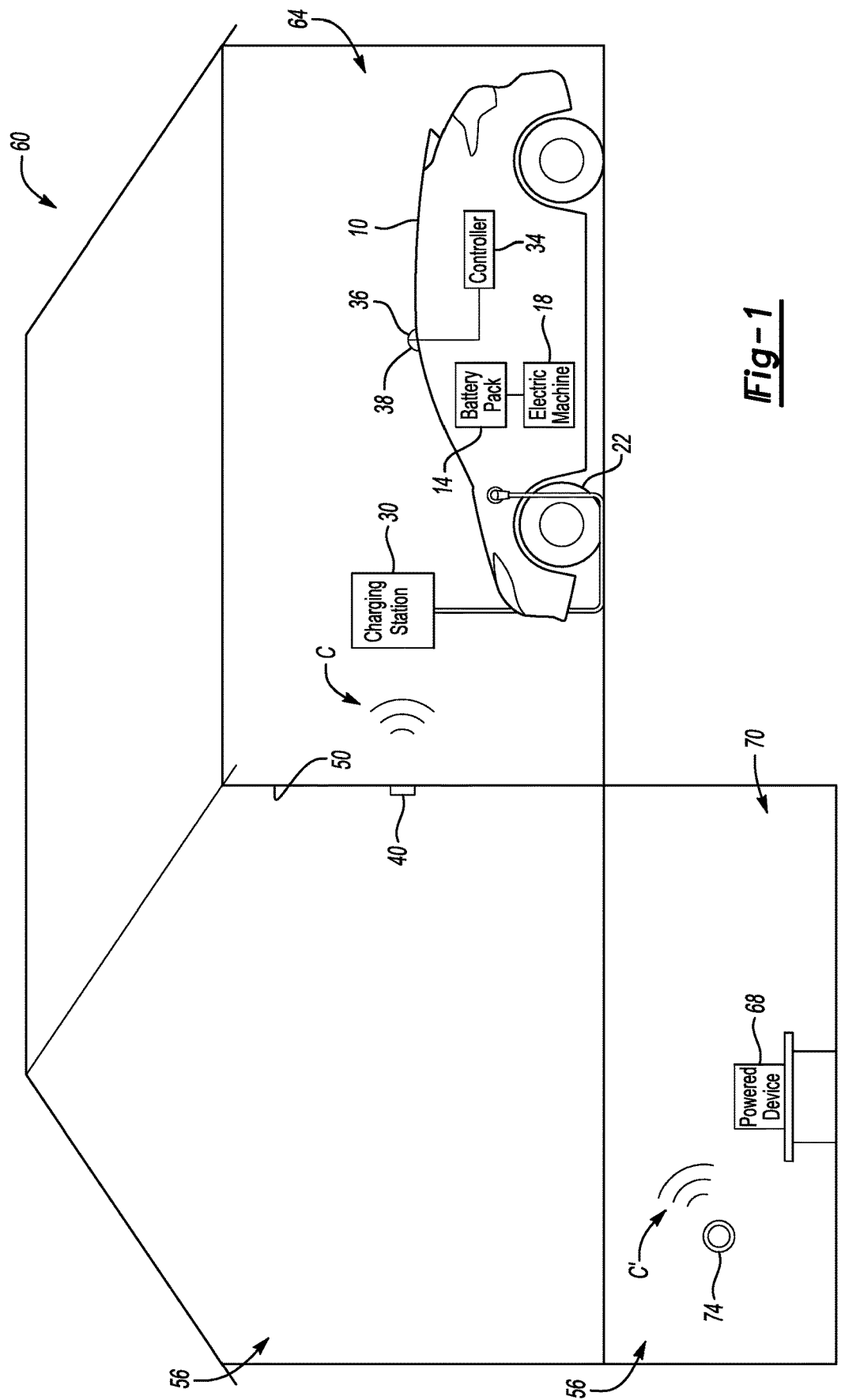
FIG. 1 illustrates an exemplary electrified vehicle and an exemplary range extending system.
Figure 2:
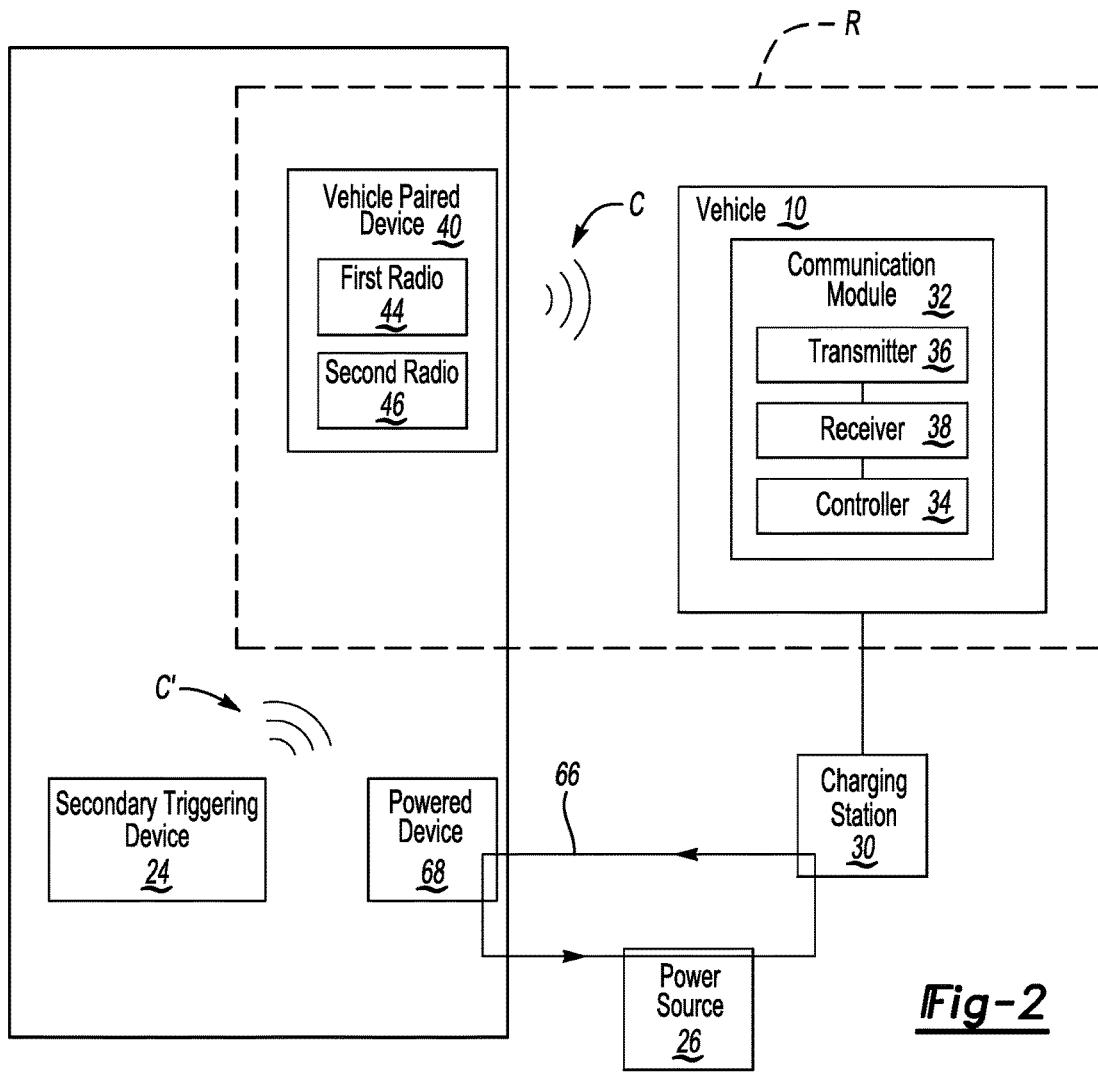
FIG. 2 illustrates a highly schematic view of the electrified vehicle and range extending system of FIG. 1.

Referring to FIGS. 1 and 2, an example vehicle 10 is an electrified vehicle that includes a battery pack 14, an electric machine 18 and a pair of wheels 22. The electric machine 18 can receive electric power from the battery pack 14. The electric machine 18 converts the electric power to torque that drives the wheels 22. The battery pack 14 can be considered a relatively high-voltage traction battery pack.

The example vehicle 10 is an all-electric vehicle. In other examples, the vehicle 10 is a hybrid electric vehicle, which can selectively drive the wheels 22 with torque provided by an internal combustion engine instead of, or in addition to, the electric machine. In other examples, the vehicle 10 is a conventional vehicle.

Electrified vehicles, such as the vehicle 10, differ from conventional motor vehicles because electrified vehicles are selectively driven using one or more electric machines powered by a battery pack. Electric machines can drive the electrified vehicles instead of, or in addition to, an internal combustion engine.

The battery pack 14 can periodically recharge using a grid power source 26 (FIG. 2). The example vehicle 10 is shown during a charging cycle, where the vehicle 10 is coupled to a charging station 30 and charging the battery pack 14 using the charging station 30.

The vehicle 10 includes a communication module 32 having a primary security controller 34, a transmitter 36 and a receiver 38. The communication module 32 can be part of, for example, a vehicle or engine control module, a battery electric control, etc. within the vehicle.

The example controller 34 can include a processor operatively linked to a memory portion. The processor can be programmed to execute a program stored in the memory portion. The program may be stored in the memory portion as software code may include one or more additional or separate programs, each of which includes an ordered listing of executable instructions for implementing logical functions.

The processor can be a custom made or commercially available processor, a central processing unit (CPU), an auxiliary processor among several processors associated with the controller 34, a semiconductor based microprocessor (in the form of a microchip or chip set) or generally any device for executing software instructions.

The memory portion can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

A vehicle-paired device 40 is located outside the vehicle 10. The vehicle-paired device 40 includes a first radio communication system 44 and a second radio communication system 46. Both the first radio communication system 44 and the second radio communication system 46 can transmit and receive signals. In another example, the vehicle-paired device 40 includes a single radio communication system that can transmit and receive signals.

Using the first radio communication system 44, the vehicle-paired device 40 can transmit a single as a command C to vehicle 10. The command C is a relatively short-range wireless command. The command C could be a wireless command of any radio protocol or wireless technology standard including, but not limited to BLUETOOTH® or Wi-Fi.

The command C is received by the receiver 38 of the vehicle 10, and interpreted by the controller 34 of the vehicle 10. In response to the command C the controller 34 initiates a vehicle function. The command C could initiated from the vehicle-paired device 40 can, for example, stop the charging cycle.

The vehicle-paired device 40 can also send other commands to the vehicle 10 to control other vehicle functions. The other commands could, for example, start a charge of the battery pack 14, start or stop a preconditioning cycle, lock or unlock the vehicle 10, etc.

The vehicle-paired device 40, in this example, is paired to the vehicle 10. Pairing, for purpose of this disclosure, means that the vehicle-paired device 40 is authorized to communicate with the vehicle 10. If a device that has not been paired with the vehicle 10 attempts to communicate with the vehicle 10, the vehicle 10 may not respond to those communications.

The vehicle-paired device 40 could include, in the communications with the vehicle 10, an identifier, such as an alphanumeric code. If the vehicle 10 recognizes the identifier, the vehicle 10 interprets the communications as communications from the vehicle-paired device 40. The vehicle 10 does not respond to communications from devices that are not paired with the vehicle 10 and lack the code.

In a non-limiting embodiment, the vehicle-paired device 40 is a non-keyfob device resembling a puck. The vehicle-paired device 40 is mounted to a wall 50 in a home 60 within a communication range of the vehicle 10. A user could mount the vehicle-paired device 40 within an interior 56 of the home 60, for example. The vehicle-paired device 40 could be powered by grid power from the home 60, or could be battery or solar powered. In another non-limiting embodiment, the vehicle-paired device 40 is a keyfob device.

Fob devices, such as a non-keyfob and keyfob have relatively limited functionality and are relatively inflexible to changes in their design intent. Infotainment systems devices, in contrast to fob devices, can potentially be reprogrammed to communicate with other systems. Fob devices are relatively restricted in their functionality when compared to infotainment system devices and many other devices.

The user interacts with the vehicle-paired device 40 to control functions of the vehicle 10, which is located in a garage 64 outside the interior 56 of the home 60. User interaction with the vehicle-paired 60 device could include the user pressing a button on the vehicle-paired device 40, such as a button that responds to a press by transmitting the command C to the vehicle 10 that causes the controller 34 to stop the charging procedure.

A user within the interior 56 may wish to stop or pause the charging procedure if, for example, the charging station 30 is utilizing a circuit 66, and the user wants to use a powered device 68 on the same circuit 66. The powered device could be a microwave, for example. The stop of the charging may pause the charge or stop the charge until the user starts the charge.

Since the charging station 30 and powered device 68 both drawn power from the same circuit 66, using the powered device 68 while the vehicle 10 is charging may undesirably overload or trip the circuit 66.

Rather than overload or trip the circuit 66, the user stops the charging while using the powered device 68. If the user stops the charging by pausing the charging, the charging may resume after a set time, say five minutes. In another example, starting the charging again may require the user to interact again with the vehicle-paired device 40, or to interact with the vehicle 10 or charging station 30.

Because the user can command the vehicle 10 to stop or pause the charging procedure using the vehicle-paired device 40 within the interior 56, the user does not need to enter the garage 64 and interact with the vehicle 10 to stop or pause the charge.

In some situations, the user may want to send a command to the vehicle 10 without directly interacting with the vehicle-paired device 40. For example, the user may be in a basement 70 of the interior 56 and not want to move upstairs to the location of the vehicle-paired device 40 to send a command to the vehicle 10.

If the vehicle-paired device 40 were portable, such as when the vehicle-paired device 40 is a keyfob, the user could take the vehicle-paired device 40 into the basement 70. However, moving the vehicle-paired device 40 further from the vehicle 10 may take the vehicle-paired device 40 outside a range R suitable for communicating with the vehicle 10.

In the example of FIGS. 1 and 2, moving the vehicle-paired device 40 near the powered device 68 takes the vehicle-paired device 40 outside the range R. Thus, if the vehicle-paired device 40 is positioned near the powered device 68, the vehicle-paired device 40 could not reliably send commands to the vehicle 10.

In such situations, the user interacts with a secondary triggering device 74 to command the vehicle 10. In response to an input from the user, the secondary triggering device 74 transmits a signal as a command C' to the vehicle-paired device 40. The second radio communication system 46 of the vehicle-paired device 40 receives the command C' and relays the command C to the vehicle 10 in response to the command C'.

If the vehicle-paired device 40 is at a first location relative to the vehicle 10, the secondary triggering device 74 is at a second location further from the vehicle 10. In another example, the secondary triggering device 74 may be closer to the vehicle 10 than the vehicle-paired device 40, but the user still uses the secondary triggering device 74 to initiate the C'. The user may choose to do this so the user does not have to move from the basement 70 upstairs to the location of the vehicle-paired device 40.

In a non-limiting embodiment, the vehicle-paired device 40 and the secondary triggering device 74 are both authorized to communicate using a local network, such as a Wi-Fi network for the home 60. The second radio communication system 46 of the vehicle-paired device 40 communicates with the secondary triggering device 74 in this example.

The secondary triggering device 74 could be a human machine interface for a home control system, such as a security system or a NEST based system. The secondary triggering device 74 could also be a smart phone or smart watch carried by the user, or a personal computer. The user can initiate the command C' from the secondary triggering device 74 by interfacing, for example, with a touch screen of the secondary triggering device 74 by opening an app associated with sending the command C', and then tapping a button on the touch screen to send the command C'. The vehicle-paired device 40 and controller 34 could provide an application programming interface (API) specification for interfacing with the vehicle-paired device 40. The secondary triggering device 74 can then be configured to utilize the API specification to communicate the command C' to the vehicle-paired device 40.

After sending the command C', the vehicle 10 stops the charging procedure and the user can use the powered device 68.

The secondary triggering device 74 permits the user to command the vehicle 10 from within the areas of the home 60 covered by the local network. Because of the secondary triggering device 74, the user is not required to move to the location of the vehicle-paired device 40 to send the command C to the vehicle 10. That is, the vehicle-paired device 40 can remain within the range R of the vehicle 10, while the user commands the vehicle 10 from outside the range R using the secondary triggering device 74. The vehicle-paired device 40 effectively extends the areas where the user can command the vehicle 10.

The command C' is transmitted to the vehicle-paired device 40 and is not transmitted directly to the vehicle 10. The vehicle-paired device 40 acts, in some examples, as a firewall or authentication device preventing unauthorized remote access to the vehicle 10. An example of the controller 34 would not execute code in response to a command send directly from the secondary triggering device 74 to the vehicle 10 without effectively being authenticated by passing through the vehicle-paired device 40. In such an example, the secondary triggering device 74 acts as extension of the vehicle-paired device 40 rather than a device that directly commands the vehicle 10.

Some known systems permit a user to command a vehicle through a computer-based interface that transmits the commands to a cloud-server for relaying to the vehicle. These systems incorporate a third party into the communications, which some users can view as a security concern.

Since the commands between the secondary triggering device 74 and the vehicle-paired device 40 are carried out over a local network, the user does not need to send information to a third party in order to command the vehicle from outside the range R of the vehicle 10 and the vehicle-paired device 40.

A signal strength of signals sent from the secondary triggering device 74 may, in some examples, be stronger than a signal strength of signals send from the vehicle-paired device 40. The stronger signal can help to ensure that commands from the secondary triggering device 74 reach the vehicle-paired device 40.

Figure 3:
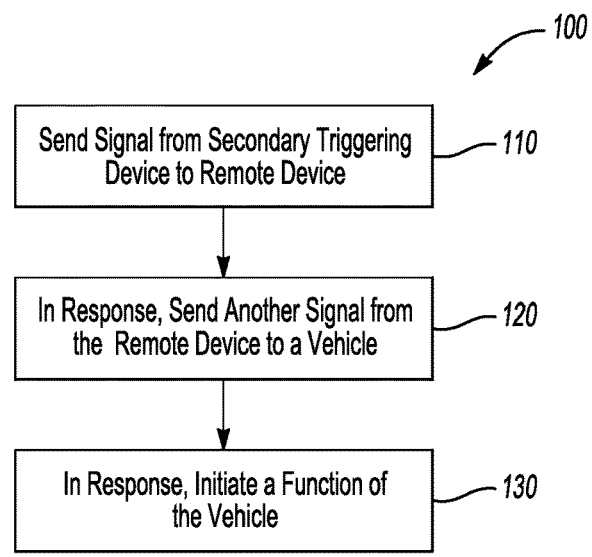
FIG. 3 illustrates the flow of a method of controlling the vehicle of FIG. 1 using the range extending system of FIG. 1.

Referring now to FIG. 3 with continuing reference to FIGS. 1 and 2, an exemplary method 100 of controlling the vehicle 10 from a remote location includes a step 110 sending a signal from the secondary triggering device 74 to the vehicle-paired device 40. An example of this signal is the command C' sent from the secondary triggering device 74 to the vehicle-paired device 40.

At a step 120, in response to the signal from the secondary triggering device 74, the vehicle-paired device 40 transmits another signal to the vehicle 10. An example of the other signal is the command C transmitted from the vehicle-paired device 40 and received by the communication module 32 of the vehicle 10.

The method 100 then, at a step 130, initiates a vehicle function in response to receiving the signal from the vehicle-paired device 40. An example of the initiating includes the controller 34 commanding the vehicle 10 to stop or pause the charging procedure.

Features of the disclosed embodiments include permitting a user to control a vehicle function from a position remote from a vehicle and remote from a vehicle-paired device. The user can control the vehicle using a local network to reduce data exposed to third-parties. Since the vehicle-paired device is used as a relay for the communications to the vehicle, the secondary triggering device that transmits a signal to the vehicle-paired device does no need to be paired to the vehicle. Further, the secondary triggering device does not require direct access to a communication medium within the vehicle, such as a CAN network.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of controlling a vehicle from a remote location, comprising:

receiving, at a vehicle, a first signal from a vehicle-paired device within a wireless communication range of the vehicle and initiating a vehicle function in response to the first signal, the first signal sent by the vehicle-paired device in response to a second signal sent from a secondary triggering device that is outside the wireless communication range, the first signal is a wireless communication signal.

2. The method of claim 1, wherein the vehicle-paired device is in a first location remote from the vehicle and the secondary triggering device is in a second location remote from the vehicle.

3. The method of claim 2, wherein the first and second locations are within an interior of a building, wherein the second location is further from the vehicle than the first location.

4. The method of claim 1, wherein a radio communication system of the vehicle can receive the first signal and then initiate the vehicle function when the vehicle-paired device is within the communication range, the radio communication system of the vehicle cannot receive the first signal and then initiate the vehicle function when the vehicle-paired device is outside the communication range.

5. The method of claim 1, wherein the second signal is communicated from the secondary triggering device to the vehicle-paired device via a local area network.

6. The method of claim 1, wherein initiating the vehicle function comprise stopping a charging procedure.

7. The method of claim 6, wherein the vehicle-paired device is configured such that a user can interact directly with the vehicle-pared device to initiate a stopping of the charging procedure.

8. The method of claim 6, wherein a user interacts with the secondary triggering device to send the second signal, and further comprising, after stopping the charging procedure, the user uses a powered device, wherein the powered device and a charging station that charges the vehicle during the charging procedure both draw power from the same circuit.

9. The method of claim 1, wherein the secondary triggering device is part of a home control system, and the vehicle-paired device is a non-keyfob device mounted in a fixed position within a home having the home control system.

10. The method of claim 1, wherein the secondary triggering device and the vehicle are unpaired.

11. A range extending system, comprising:
a vehicle-paired device configured to transmit a first signal to a vehicle when within a communication range of the vehicle; and
a secondary triggering device that transmits a second signal from outside the communication range to the vehicle-paired device to initiate a transmission of the first signal from the vehicle-paired device, the first signal is a wireless communication signal, wherein the secondary triggering device is part of a home control system.

12. The range extending system of claim 11, wherein the vehicle-paired device is a non-key fob device.

13. The range extending system of claim 11, wherein the vehicle-paired device is mounted in a fixed position outside the vehicle.

14. The range extending system of claim 11, wherein the vehicle-paired device is in a first position within the communication range of the vehicle, and the secondary triggering device is in a second position that is outside the communication range, wherein the first and second locations are within an interior of a building.

15. The range extending system of claim 11, wherein the secondary triggering device is remote from the vehicle-paired device.

16. The range extending system of claim 11, wherein the vehicle-paired device is configured such that the vehicle-paired device can transmit a third signal to the vehicle in response to a user interacting directly with the vehicle-paired device, the vehicle stopping a charge of a traction battery in response to the third signal.

17. The range extending system of claim 11, wherein the vehicle-paired device includes a first radio communication system to communicate the first signal to the vehicle and a separate, second radio communication system to communicate with the secondary triggering device.

18. A range extending system, comprising:
a vehicle-paired device configured to transmit a first signal to a vehicle when within a communication range of the vehicle;
a secondary triggering device that transmits a second signal from outside the communication range to the vehicle-paired device to initiate a transmission of the first signal from the vehicle-paired device, the first signal is a wireless communication signal; and
the vehicle, wherein the vehicle is configured to initiate a vehicle function in response to the first signal, wherein the first signal is a wireless command of a wireless technology standard.

19. The range extending system of claim 18, wherein the vehicle function comprises stopping a charge station charging a traction battery of the vehicle, wherein a powered device outside of the communication range and the charge station are powered by a common power circuit.

* * * * *